United States Patent
Wang et al.

(10) Patent No.: US 12,272,177 B2
(45) Date of Patent: Apr. 8, 2025

(54) METHOD AND APPARATUS FOR CONSTRUCTING THREE-DIMENSIONAL DATA SET OF PEDESTRIAN RE-IDENTIFICATION BASED ON NEURAL RADIATION FIELD

(71) Applicant: ZHEJIANG LAB, Hangzhou (CN)

(72) Inventors: Hongsheng Wang, Hangzhou (CN); Guang Chen, Hangzhou (CN); Hujun Bao, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 358 days.

(21) Appl. No.: 17/950,033

(22) Filed: Sep. 21, 2022

(65) Prior Publication Data
US 2023/0410560 A1    Dec. 21, 2023

Related U.S. Application Data

(63) Continuation of application No. PCT/CN2022/116174, filed on Aug. 31, 2022.

(30) Foreign Application Priority Data

Jun. 15, 2022   (CN) .......................... 202210670964.1

(51) Int. Cl.
  *G06V 40/20*   (2022.01)
  *G06V 10/56*   (2022.01)
  (Continued)

(52) U.S. Cl.
  CPC .............. *G06V 40/25* (2022.01); *G06V 10/56* (2022.01); *G06V 10/82* (2022.01); *G06V 20/64* (2022.01)

(58) Field of Classification Search
  CPC ........ G06V 40/25; G06V 10/56; G06V 10/82; G06V 20/64; G06V 10/774; G06V 20/52;
  (Continued)

(56) References Cited

U.S. PATENT DOCUMENTS 4,387,365 A *  6/1983  Berry ...................... G01S 7/298
                                                342/185
9,131,202 B1 *  9/2015  Espeset ................ H04N 19/139
  (Continued)

FOREIGN PATENT DOCUMENTS

WO       2022104299 A1    5/2022

OTHER PUBLICATIONS

National Intellectual Property Administration of People's Republic China, The First Office Action issued on Aug. 2, 2022 in Chinese Patent Application No. 202210670964.1, 14 pages with translation.

*Primary Examiner* — Ali Bayat
(74) *Attorney, Agent, or Firm* — IPro, PLLC

(57) ABSTRACT

Disclosed are a method and apparatus for constructing a three-dimensional data set of a pedestrian re-identification based on a neural radiation field. The method includes the following steps: S1: capturing images of pedestrians to be entered by a group of cameras at different viewing angles; S2: generating a three-dimensional spatial position point set by sampling through camera rays in the scenario, and converting observation directions of the cameras corresponding to the three-dimensional spatial position point set into three-dimensional Cartesian unit vectors; and S3: inputting, into a multi-layer sensor, the three-dimensional spatial position point set and the observation directions converted into the three-dimensional Cartesian unit vectors, to output corresponding densities and colors. The method and apparatus of the present disclosure gives a brand-new method for constructing a pedestrian re-identification data set, and provides a new idea of data set construction.

9 Claims, 2 Drawing Sheets

(51) Int. Cl.
*G06V 10/82* (2022.01)
*G06V 20/64* (2022.01)

(58) Field of Classification Search
CPC .... G06V 20/647; G06V 40/103; G06T 17/00; G06T 15/005; G06T 15/55; G06T 2200/08; G06N 3/04; G06N 3/08
USPC .......................................................... 382/103
See application file for complete search history.

(56) References Cited

U.S. PATENT DOCUMENTS

| | | | |
|---|---|---|---|
| 2021/0100481 A1* | 4/2021 | Abdel-Malek | G06V 40/103 |
| 2022/0198738 A1* | 6/2022 | Xu | G06T 17/00 |
| 2022/0230216 A1* | 7/2022 | Buibas | G06V 10/454 |
| 2023/0154101 A1* | 5/2023 | Bradley | G06T 15/04 |
| | | | 345/426 |

* cited by examiner

METHOD AND APPARATUS FOR CONSTRUCTING THREE-DIMENSIONAL DATA SET OF PEDESTRIAN RE-IDENTIFICATION BASED ON NEURAL RADIATION FIELD

CROSS-REFERENCE TO RELATED APPLICATIONS

The present application claims priority to Chinese Patent Application No. 202210670964.1 filed to China National Intellectual Property Administration on Jun. 15, 2022 and entitled "METHOD AND APPARATUS FOR CONSTRUCTING THREE-DIMENSIONAL DATA SET OF PEDESTRIAN RE-IDENTIFICATION BASED ON NEURAL RADIATION FIELD", which is incorporated herein by reference in its entirety.

TECHNICAL FIELD

The present disclosure relates to the field of pedestrian re-identification technology, and in particular, to a method and apparatus for constructing a three-dimensional data set of a pedestrian re-identification based on a neural radiation field.

BACKGROUND

Pedestrian re-identification is widely regarded as a sub-problem of image retrieval. It uses computer vision technology to determine whether there are specific pedestrians in videos and images, and under the condition of given pedestrian images, cross-device retrieval is performed on the images of the pedestrians. The pedestrian re-identification technology can be combined with multiple technologies and applied to security, video surveillance, prisoner surveillance, etc.

The pedestrian re-identification technology has many advantages, for example, it uses conditions such as gait, physical characteristics and clothing to identify pedestrians more comprehensively, and can retrieve pedestrians across devices under a multi-camera device network. Whether used alone or in combination with other technologies, it can provide great value, but it also brings great challenges, such as susceptibility to wear, occlusion, posture and perspective. When pedestrian re-identification data are collected, the factors that need to be considered are: data collection needs to be cross-device; the scale of an open data set is far smaller than the actual demand; the factors that affect the identification are numerous, and the processing is difficult; the surveillance involves the privacy of data and pedestrians. Both pose challenges and research priorities for pedestrian re-identification.

Compared with an actual monitoring network, the numbers of pedestrians and cameras in the early data set are small, and the amount of data is small; the time span is short, the illumination condition changes little, and data under different illumination is lacking; the scenario is single, and the scenario coverage is small; there are also disadvantages such as high cost of manual annotation and cumbersome and difficult data collection. The quality of data needs to be improved urgently, so more accurate methods are needed to construct data sets.

SUMMARY

The present disclosure provides a method and apparatus for constructing a three-dimensional data set of a pedestrian re-identification based on a neural radiation field, which provides a new idea of data entry methods: by inputting parameters representing a five-dimensional scenario, a group of captured images are optimized and rendered; meanwhile, by improving the existing method, different rendered images can be generated, and the data set can be enriched and improved to meet the challenges of small data scale and difficult data collection.

To achieve the above objective, the present disclosure provides the following technical solutions:

The present disclosure discloses a method for constructing a three-dimensional data set of a pedestrian re-identification based on a neural radiation field, including the following steps:

S1: capturing images of pedestrians to be entered by a group of cameras at different viewing angles;

S2: generating a three-dimensional spatial position point set by sampling through camera rays in the scenario, and converting observation directions of the cameras corresponding to the three-dimensional spatial position point set into three-dimensional Cartesian unit vectors;

S3: inputting, into a multi-layer sensor, the three-dimensional spatial position point set and the observation directions converted into the three-dimensional Cartesian unit vectors, to output corresponding densities and colors;

S4: accumulating, by using a neural volume rendering method, ray colors passing through each pixel into the images captured in step S1, including the following sub-steps:

S41: defining cumulative transparency rates of the camera rays by continuous integration, and generating definitions of the ray colors accordingly;

S42: estimating the ray colors by using a quadrature method, dividing near boundaries to far boundaries of the rays into N uniformly spaced intervals, and selecting discrete points by using a stratified sampling method;

S5: introducing position encoding and multi-level sampling to improve the quality of the images generated by the accumulation of ray colors in step S4, specifically:

S51: introducing position encoding: encoding the spatial positions of the points, and converting the three-dimensional vectors input into a neural network into specified dimensions, to increase the accuracy of the generated images;

S52: introducing multi-level sampling: first collecting a group of points by stratified sampling, preliminarily evaluating the neural network, generating a probability density function based on the output of the preliminarily evaluated neural network, then collecting points along each ray based on the probability density function, and combining the points sampled twice to evaluate the neural network more accurately; and S6: labeling the generated images and storing the same in a data set.

Preferably, the three-dimensional spatial position point set in step S2 refers to three-dimensional spatial positions (x, y, z) where the cameras are located, and the observation directions of the cameras corresponding to the three-dimensional spatial position point set are d, which can be converted into the three-dimensional Cartesian unit vectors.

Preferably, the specific process of step S3 is: inputting, into the multi-layer sensor, the spatial positions and observation directions ($\zeta$, d) of the cameras, to output colors and densities (c, σ) of points, where $\zeta$ is the spatial position (x, y, z), d is the three-dimensional Cartesian unit vector converted from the observation direction, c is the color, and $\sigma$ is the volume density.

Preferably, the neural volume rendering method in step S4 is specifically as follows: tracing light in the scenario, and integrating specified lengths of light to generate images or videos, wherein in the method of generating images from three-dimensional scalar data, the color of any ray passing through the scenario needs to be rendered into an image.

Preferably, the specific process of step S41 is: marking each camera ray as r(t)=o+td, where o is an origin of the ray, d is the observation direction, t refers to the position of a certain point in the space through which the camera ray passes, and the specific definition of a ray color is as follows:

$$c(r)\int_{t_n}^{t_f} T(t)\sigma(r(t))c(r(t),d)dt;$$

Herein, $t_n$ and $t_f$ are the near boundary and far boundary of the ray, c is the color, $\sigma$ is the volume density, and T(t) is a cumulative transparency of the ray on the path from $t_n$ to $t_f$ that is, a probability that the ray on the path from $t_n$ to t does not hit any particle, specifically:

$$T(t)=\exp(-\int_{t_n}^{t} \sigma(r(s))ds$$

Preferably, step S42 is specifically: dividing the distance $[t_n, t_f]$ between the near boundary $t_n$ and far boundary $t_f$ of the ray into N uniformly spaced intervals, and then randomly extracting a sample from each interval, that is, $t_i$ obeys a uniform distribution:

$$t_i \sim U\left[t_n + \frac{i-1}{N}(t_f - t_n), t_n + \frac{i-1}{N}(t_f - t_n)\right], i = 1, 2, \ldots, N;$$

Then the integration formula of the ray colors C(r) can be simplified as:

$$\hat{C}(r) = \sum_{i=1}^{N} T_i \cdot (1 - \exp(-\sigma_i \delta_i)) \cdot c_i;$$

Herein, $\delta_i = t_{i+1} - t_i$, $T_i = \exp(-\sum_{j=1}^{j-1} \sigma_j \delta_j)$, $\sigma_i$ represents the volume density, and $c_i$ represents the color.

Preferably, the specific method of introducing position encoding in step S51 is: standardizing the spatial positions $\zeta$ and the observation directions d, and encoding each coordinate value in the spatial positions and the observation directions as follows:

$$\gamma(p)=(\sin(2_0\pi p), \cos(2^0\pi p), \ldots, \sin(2^{L-1}\pi p), \cos(2^{L-1}\pi p)).$$

Preferably, the specific sub-steps of introducing multi-level sampling in step S52 are as follows:

Step 1: collecting $N_c$ points on the rays by stratified sampling;

Step 2: inputting the sampled points, and preliminarily evaluating the neural network at the sampled points by using the quadrature method;

Step 3: generating the probability density function by normalization, and rewriting the integration formula in step S42 as:

$$\hat{C}_r(r) = \sum_{i=1}^{N} \omega_i c_i;$$

Herein, $\omega_i = T_i \cdot (1 - \exp(-\sigma_i \cdot \delta_i))$, $\hat{\omega}_i$ is normalized $$\hat{\omega}_i = \frac{\omega_i}{\sum_{j=1}^{x_c} \omega_j}$$

to generate a piecewise constant probability density function;

Step 4: collecting $N_f$ points along each ray based on the above probability density function; and Step 5: evaluating the neural network more accurately by using the collected ($N_c + N_f$) points, so as to better render the ray colors.

The present disclosure further discloses an apparatus for constructing a three-dimensional data set of a pedestrian re-identification based on a neural radiation field, the apparatus includes a memory and one or more processors, the memory stores executable codes, and the one or more processors execute the executable codes to implement the above-mentioned method for constructing a three-dimensional data set of a pedestrian re-identification based on a neural radiation field.

Beneficial effects of the present disclosure are as follows: the present disclosure discloses a method and apparatus for constructing a three-dimensional data set of a pedestrian re-identification based on a neural radiation field, which gives a brand-new method for constructing a pedestrian re-identification data set, and provides a new idea of data set construction. Compared with the traditional data set construction method, the data acquisition is more direct and clearer through the images and spatial positions collected by multiple devices; the neural radiation field is introduced to reconstruct three-dimensional images on the basis of the existing data, and the constructed images with different effects are improved to simulate images in different scenarios and under different lighting, which greatly enriches a data set; after data are collected and reconstructed, the data are labeled, which reduces the late cost of manual labeling; and the three-dimensional data set constructed by the method contains more comprehensive and complete information.

BRIEF DESCRIPTION OF FIGURES

In FIG. 2: 1—camera, 2—camera ray, 3—sampled point, 4—color accumulated by a neural volume rendering method, 5—sampling object.

DETAILED DESCRIPTION

In order to make the objectives, technical solutions and advantages of the present disclosure clearer, the following further describes the present disclosure in detail through the accompanying drawings and embodiments. However, it should be understood that the specific embodiments described herein are only used to explain the present invention, but not to limit the scope of the present invention. In addition, descriptions on well-known structures and technologies are omitted below in order to avoid unnecessarily obscuring the concept of the present invention.

The neural radiation field, as a brand-new technology, is a method of inputting multiple images and connecting the same with a multi-layer sensor (neural network) to represent a three-dimensional scenario. The multi-layer sensor can be stored in a file equivalent to a compressed image in size. Under the representation of this technology, the rendered image shows satisfactory accuracy, details at any viewing angle can be rendered, and a complex scenario can be modeled with high resolution. Meanwhile, the neural radiation field overcomes high storage cost of discrete voxel grids.

In view of this, the present disclosure provides a method and apparatus for constructing a three-dimensional data set of a pedestrian re-identification based on a neural radiation field, which provides a new idea of data entry methods: by inputting parameters representing a five-dimensional scenario, a group of captured images are optimized and rendered; meanwhile, by improving the existing method, different rendered images can be generated, and the data set can be enriched and improved to meet the challenges of small data scale and difficult data collection.

Figure 1:
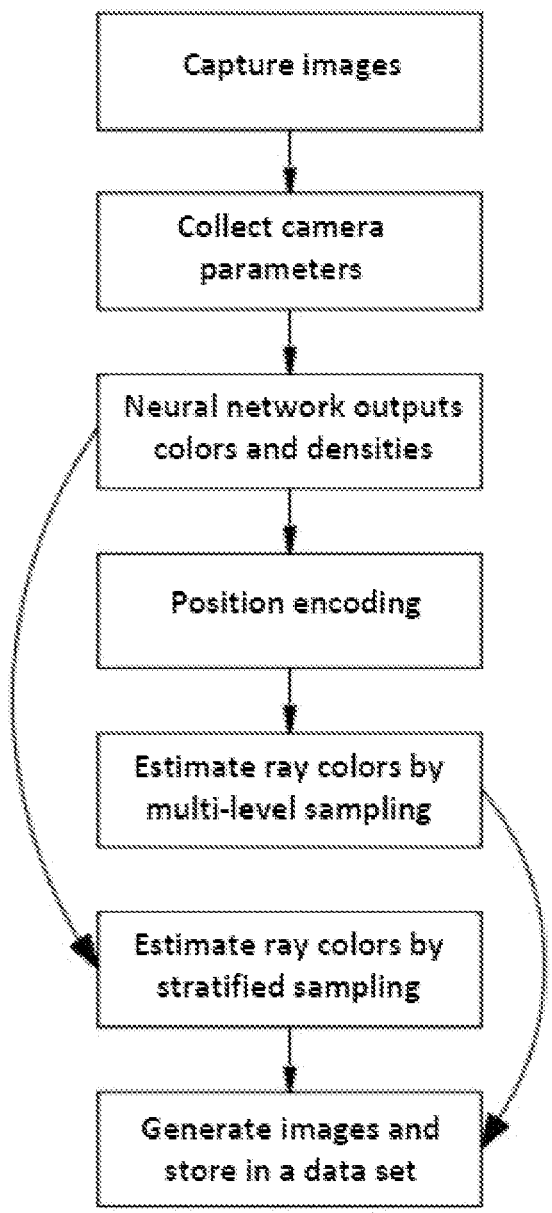
FIG. 1 is an architecture diagram of a method and apparatus for constructing a three-dimensional data set of a pedestrian re-identification based on a neural radiation field.

As shown in FIG. 1, an embodiment of the present disclosure provides a method for constructing a three-dimensional data set of a pedestrian re-identification based on a neural radiation field, the method including the following steps.

Step 1: Capture Images:
Images of pedestrians to be entered are captured multiple times by a group of cameras at different viewing angles. For a specific pedestrian to be entered, a large number of images with known camera parameters, that is, images with known spatial positions and observation directions, need to be provided.

Step 2: Collect Data of Spatial Positions and Observation Directions of Cameras:
A sampled three-dimensional point set is generated by means of camera rays in the scenario, and three-dimensional spatial positions ζ(x, y, z) of points and observation directions d (ϑ, φ) of the cameras are acquired.

In fact, the observation directions of the cameras corresponding to the three-dimensional spatial position point set can be converted into three-dimensional Cartesian unit vectors.

Step 3: Output Densities and Colors by a Neural Network:
A multi-layer sensor, also known as an artificial neural network, includes an input layer, an output layer, and a plurality of hidden layers in the middle. It weights each input dimension to obtain an output dimension, and adds an activation function therein to obtain a model capable of learning a nonlinear relationship, so as to achieve better results.

The present disclosure uses a multi-layer sensor $F_\Theta:(\zeta, d) \rightarrow (c, \sigma)$. The input is ζ, a spatial position is (x, y, z), and d is the observation direction, which is represented by a three-dimensional Cartesian unit vector; the output is the color and density of each point, that is, c is the RGB color (r, g, b), and σ is the volume density.

The weights Θ can be optimized by using the aforesaid method, and the above collected three-dimensional spatial position point set and the observation directions thereof are input to this mapping to obtain corresponding volume densities and colors.

Step 4: Synthesize Images by Volume Rendering Technology:
The volume rendering method refers to a variety of methods to generate images from three-dimensional scalar data, and can visualize volume data under complex lighting by conventional path tracing, photon mapping, etc. Neural volume rendering refers to a method of tracing light in the scenario and integrating certain lengths of light to generate images or videos.

The present disclosure uses a classical volume rendering method, namely neural volume rendering, to estimate the color of any ray passing through the scenario. The camera ray is marked as r(t)=o+td, where o is an origin of the ray, d is the aforesaid observation direction, and t refers to the position of a certain point in the space through which the camera ray passes. The ray color is defined by a continuous integral, which is defined as follows:

$$C(r) = \int_{t_n}^{t_f} T(t)\sigma(r(t))c(r(t), d)dt \qquad (1);$$

Herein, $t_n$ and $t_f$ are the near boundary and far boundary of the ray, and T(t) is a cumulative transparency of the ray on the path from $t_n$ to t, that is, a probability that the ray on the path from $t_n$ to t does not hit any particle, specifically:

$$T(t) = \exp(-\int_{t_n}^{t} \sigma(r(s))ds.$$

The above-mentioned continuous neural radiation field rendering view needs to estimate the color of the ray that passes through each pixel of a virtual camera, that is, estimate a continuous integral C(r). In the present disclosure, a quadrature method is used to estimate the value of the continuous integral. Due to the nature of the multi-layer sensor, it can query only a group of fixed discrete points, so the deterministic orthogonality used to render discrete voxel grids limits the resolution represented by the scenario. The present disclosure uses a stratified sampling method: dividing the distance $[t_n, t_f]$ between the near boundary $t_n$ and far boundary $t_f$ of the ray into N uniformly spaced intervals, and then randomly extracting a sample from each interval, that is, $t_i$ obeys a uniform distribution:

$$t_i \sim U\left[t_n + \frac{i-1}{N}(t_f - t_n), t_n + \frac{i-1}{N}(t_f - t_n)\right], i = 1, 2, \ldots, N;$$

Throughout the process, stratified sampling allows the multi-layer sensor to optimize the evaluation at continuous locations, so although the integral is estimated with a discrete sample set, continuous scenarios can be represented. Then the integral can be simplified to:

$$\hat{C}(r) = \sum_{i=1}^{N} T_i \cdot (1 - \exp(-\sigma_i \delta_i)) \cdot c_i; \qquad (2)$$

Herein, $\delta_i = t_{i+1} - t_i$, $T_i = \exp(-\Sigma_{j=1}^{i-1} \sigma_j \delta_j)$, $\sigma_i$ represents the volume density, and $c_i$ represents the color.

The colors of rays passing through each pixel are accumulated into images to generate images.

Step 5: Improve Image Quality by Improved Methods:
The above process describes the parameter acquisition and image generation based on the neural radiation field technology. In order to improve the quality of the generated images and further expand the data set, the following two improvements can be made to the above method:

Improvement 1: Position Encoding

A deep network is more inclined to learn a low-frequency function. Before the input is passed to the network, the input is mapped to a higher-dimensional space by using a high-frequency function, so that the results contain high-frequency changing data to achieve better performance. Accordingly, the spatial positions ζ and the observation directions d are standardized, and each coordinate value in the spatial positions and the observation directions is encoded as follows:

$$\gamma(p)=(\sin(2^0\pi p), \cos(2^0\pi p), \ldots, \sin(2^{L-1}\pi p), \cos(2^{L-1}\pi P)).$$

In the present disclosure, for γ(x), L is set to 10, namely a vector of length 60 is obtained; and for γ(d), L is set to 4, and a vector of length 24 is obtained. The position encoding introduces a higher-dimensional space. Therefore, the position encoding enables the multi-layer sensor to approximate a high-frequency function.

A multi-layer sensor $F_\vartheta=F'_\vartheta \cdot \gamma$ is redefined, where $F'_\vartheta$ is an ordinary multi-layer sensor. On the basis of the output of the multi-layer sensor, the ray colors in the scenario are rendered, so that the images are more realistic.

Improvement 2: Multi-Level Sampling

Figure 2:
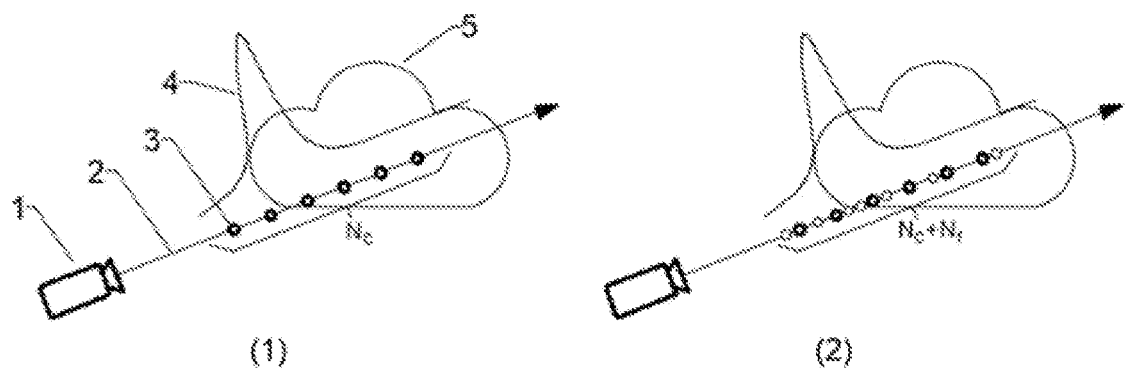
FIG. 2 is a schematic diagram of multi-level sampling.

As shown in FIG. 2, the aforesaid rendering strategy carries out estimation along each camera ray, and still repeatedly samples the space and occluded regions without valid information, which results in the inefficiency of the strategy. This improvement solution proposes multi-level sampling. In order to improve the efficiency of the rendering strategy, samples are collected in the final rendering in proportion to the expected effect.

(1) in FIG. 2 represents the collection of points of a "coarse" network, namely points are randomly collected according to the stratified sampling described above, where the number of sampled points is $N_c$. (2) in FIG. 2 represents the situation that the points sampled according to a probability density function generated after normalization are combined with the points in (1), where the number of sampled points is $N_c+N_f$.

In this solution, not just one network is optimized, but both "coarse" and "fine" networks are optimized to represent the scenario. First, a group of points are collected by stratified sampling, and the "coarse" network is evaluated. Based on the output of this "coarse" network, a probability density function is generated, then points are collected along each ray based on the probability density function, and the points sampled twice are combined to evaluate the "fine" network. Specific steps are as follows:

1. $N_c$ points are collected on the rays by stratified sampling;
2. The sampled points are input, and the neural network is preliminarily evaluated at these positions by using the quadrature method, that is, the network is "coarsely" evaluated through the above formula (2);
3. The probability density function is generated by normalization, and the formula (2) is rewritten as $$\hat{C}_r(r) = \sum_{i=1}^{N} \omega_i c_i;$$

Herein, $\omega_i=T_i \cdot (1-\exp(-\sigma_i \cdot \delta_i))$, then $\hat{\omega}_i$ is normalized $$\hat{\omega}_i = \frac{\omega_i}{\sum_{j=1}^{x_c} \omega_j}$$

to generate a piecewise constant probability density function, where $\sigma_i$ represents the volume density, and $c_i$ represents the color;

4. $N_f$ points are collected along each ray based on the above probability density function;
5. The neural network is evaluated more accurately by using the collected $(N_c+N_f)$ points, the "fine" network is evaluated by using the collected $(N_c+N_f)$ points, so as to better render the ray colors.

It is worth mentioning that the images generated by the above-mentioned two improved methods of position encoding and multi-level sampling have higher image quality, but it does not mean that the images generated in step 4 have lost their value. Due to the fact that pedestrian re-identification technology is easily affected by clothing, occlusion, posture, perspective and weather, images of different qualities and different states can enrich the pedestrian re-identification data set and create conditions for better pedestrian re-identification.

Step 6: Store the Generated Images in a Data Set:

The generated images are marked with labels corresponding to pedestrians, that is, the images are marked with the names of the pedestrians, and pedestrian data containing images of different qualities are obtained and stored in a data set. The above steps are repeated to finally generate a relatively complete data set with multiple pedestrians.

Figure 3:
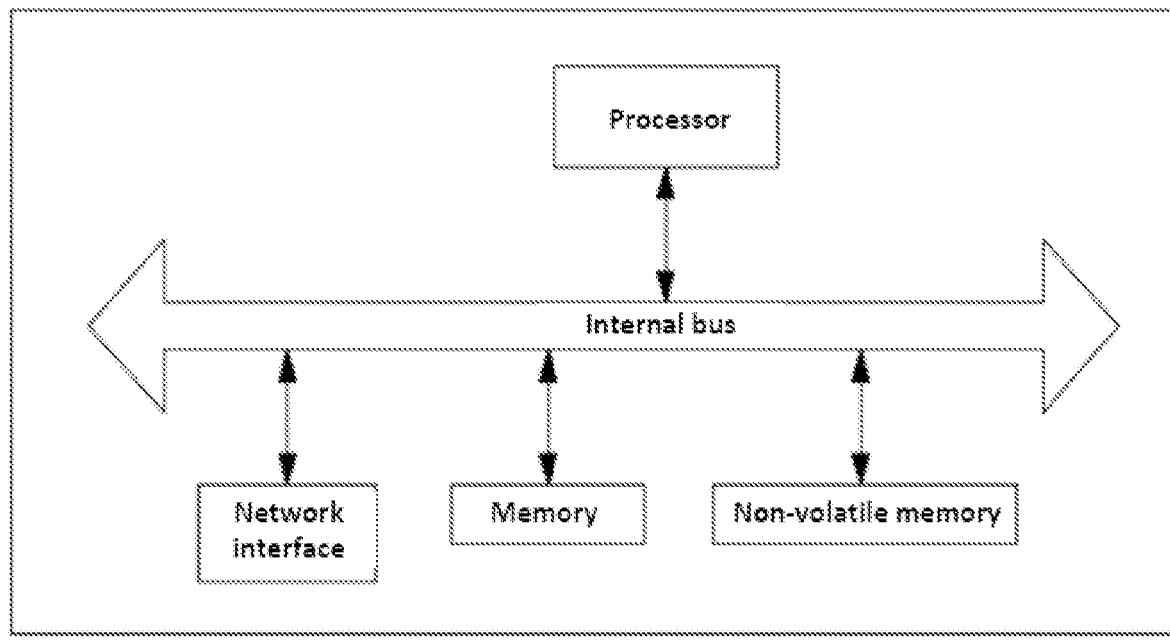
FIG. 3 is a schematic diagram of an apparatus according to an embodiment of the present disclosure.

With reference to FIG. 3, an embodiment of the present disclosure further provides an apparatus for constructing a three-dimensional data set of a pedestrian re-identification based on a neural radiation field, the apparatus includes a memory and one or more processors, the memory stores executable codes, and the one or more processors execute the executable codes to implement the method for constructing a three-dimensional data set of a pedestrian re-identification based on a neural radiation field in the above-mentioned embodiment.

The embodiment of the apparatus for constructing a three-dimensional data set of a pedestrian re-identification based on a neural radiation field in the present disclosure can be applied to any device with data processing capability, which can be a device or apparatus such as a computer. The embodiment of the apparatus can be implemented by software, hardware, or a combination of hardware and software. Taking the software implementation as an example, the logical apparatus is formed by reading corresponding computer program instructions in a non-volatile memory into a memory through a processor of any device with data processing capability where the apparatus is located. In terms of hardware, FIG. 3 shows a hardware structure diagram of any device with data processing capability where the apparatus for constructing a three-dimensional data set of a pedestrian re-identification based on a neural radiation field is located. Except the processor, memory, network interface and non-volatile memory shown in FIG. 3, the any device with data processing capability where the apparatus is located in the embodiment may further include other hardware according to its actual function. Details are not described herein. Details of the implementation process of the functions and effects of the units in the above-mentioned apparatus are shown the implementation process of the corresponding steps in the above-mentioned method, and the details are not described herein.

The embodiment of the apparatus substantially corresponds to the embodiment of the method, so relevant parts may refer to the parts of the embodiment of the method. The apparatus examples described above are merely illustrative. The units described as separate components may or may not be physically separated, and the components displayed as units may or may not be physical units, that is, they may be located in one place, or may be distributed to a plurality of network units. Some or all of the modules may be selected according to actual needs to achieve the objectives of the solutions of the present disclosure. Those of ordinary skill in the art can understand and implement without any creative effort.

An embodiment of the present disclosure further provides a computer-readable storage medium on which a program is stored, and when the program is executed by a processor, the method for constructing a three-dimensional data set of a pedestrian re-identification based on a neural radiation field in the above-mentioned embodiment is implemented.

The computer-readable storage medium may be an internal storage unit of any device with data processing capability described in any of the foregoing embodiments, such as a hard disk or a memory. The computer-readable storage medium may also be an external storage device of any device with data processing capability, such as a plug-in hard disk, a Smart Media Card (SMC), an SD card, or a flash card equipped on the device. Further, the computer-readable storage medium may further include both an internal storage unit of any device with data processing capability and an external storage device. The computer-readable storage medium is used to store the computer program and other programs and data required by the device with data processing capability, and may also be used to temporarily store data that has been output or will be output.

The above descriptions are only preferred embodiments of the present invention, and are not intended to limit the present invention. Any modifications, equivalent replacements or improvements, etc. made within the spirit and principle of the present invention shall be included in the protection scope of the present invention.

What is claimed is:

1. A method for constructing a three-dimensional data set of a pedestrian re-identification based on a neural radiation field, comprising the following steps:
   S1: capturing images of pedestrians to be entered by a group of cameras at different viewing angles;
   S2: generating a three-dimensional spatial position point set by sampling through camera rays in the scenario, and converting observation directions of the cameras corresponding to the three-dimensional spatial position point set into three-dimensional Cartesian unit vectors;
   S3: inputting, into a multi-layer sensor, the three-dimensional spatial position point set and the observation directions converted into the three-dimensional Cartesian unit vectors, to output corresponding densities and colors;
   S4: accumulating, by using a neural volume rendering method, ray colors passing through each pixel into the images captured in step S1, including the following sub-steps:
   S4-1: defining cumulative transparency rates of the camera rays by continuous integration, and generating definitions of the ray colors accordingly;
   S4-2: estimating the ray colors by using a quadrature method, dividing near boundaries to far boundaries of the rays into N uniformly spaced intervals, and selecting discrete points by using a stratified sampling method;
   S5: introducing position encoding and multi-level sampling to improve the quality of the images generated by the accumulation of ray colors in step S4, specifically:
   S5-1: introducing position encoding: encoding the spatial positions of the points, and converting the three-dimensional vectors input into a neural network into specified dimensions, to increase the accuracy of the generated images;
   S5-2: introducing multi-level sampling: first collecting a group of points by stratified sampling, preliminarily evaluating the neural network, generating a probability density function based on the output of the preliminarily evaluated neural network, then collecting points along each ray based on the probability density function, and combining the points sampled twice to evaluate the neural network more accurately; and
   S6: labeling the generated images and storing the same in a data set.

2. The method for constructing a three-dimensional data set of a pedestrian re-identification based on a neural radiation field according to claim 1, wherein the three-dimensional spatial position point set in step S2 refers to three-dimensional spatial positions (x, y, z) where the cameras are located, and the observation directions of the cameras corresponding to the three-dimensional spatial position point set are d, which can be converted into the three-dimensional Cartesian unit vectors.

3. The method for constructing a three-dimensional data set of a pedestrian re-identification based on a neural radiation field according to claim 1, wherein the specific process of step S3 is: inputting, into the multi-layer sensor, the spatial positions and observation directions $(\zeta, d)$ of the cameras, to output colors and densities $(c, \sigma)$ of points, where $\zeta$ is the spatial position (x, y, z), d is the three-dimensional Cartesian unit vector converted from the observation direction, c is the color, and $\sigma$ is the volume density.

4. The method for constructing a three-dimensional data set of a pedestrian re-identification based on a neural radiation field according to claim 1, wherein the neural volume rendering method in step S4 is specifically as follows: tracing light in the scenario, and integrating specified lengths of light to generate images or videos, wherein in the method of generating images from three-dimensional scalar data, the color of any ray passing through the scenario is rendered into an image.

5. The method for constructing a three-dimensional data set of a pedestrian re-identification based on a neural radiation field according to claim 1, wherein the specific process of step S4-1 is: marking each camera ray as r(t)=o+td, where o is an origin of the ray, d is the observation direction, t refers to the position of a certain point in the space through which the camera ray passes, and the specific definition of a ray color is as follows:

$$C(r)=\int_{t_n}^{t_f} T(t)\sigma(r(t))c(r(t),d)dt;$$

wherein $t_n$ and $t_f$ are the near boundary and far boundary of the ray, c is the color, $\sigma$ is the volume density, and T(t) is a cumulative transparency of the ray on the path from $t_n$ to t, that is, a probability that the ray on the path from $t_n$ to t does not hit any particle, specifically:

$$T(t)=\exp(-\int_{t_n}^{t}\sigma(r(s))ds).$$

6. The method for constructing a three-dimensional data set of a pedestrian re-identification based on a neural radiation field according to claim 5, wherein step S4-2 is specifically: dividing the distance $[t_n, t_f]$ between the near boundary $t_n$ and far boundary $t_f$ of the ray into N uniformly spaced intervals, and then randomly extracting a sample from each interval, that is, $t_i$ obeys a uniform distribution:

$$t_i \sim U\left[t_n + \frac{i-1}{N}(t_f - t_n), t_n + \frac{i-1}{N}(t_f - t_n)\right], i = 1, 2, \ldots, N;$$

then the integration formula of the ray colors C(r) can be simplified as:

$$\hat{C}(r) = \sum_{i=1}^{N} T_i \cdot (1 - \exp(-\sigma_i \delta_i)) \cdot c_i;$$

wherein $\delta_i = t_{i+1} - t_i$, $T_i = \exp(-\Sigma_{j=1}^{i-1} \sigma_j \delta_j)$, $\sigma_i$ represents the volume density, and $c_i$ represents the color.

7. The method for constructing a three-dimensional data set of a pedestrian re-identification based on a neural radiation field according to claim 1, wherein the specific method of introducing position encoding in step S5-1 is: standardizing the spatial positions ζ and the observation directions d, and encoding each coordinate value in the spatial positions and the observation directions as follows:

$\gamma(p) = (\sin(2^0\pi p), \cos(2^0\pi p), \ldots, \sin(2^{L-1}\pi p), \cos(2^{L-1}\pi p))$.

8. The method for constructing a three-dimensional data set of a pedestrian re-identification based on a neural radiation field according to claim 6, wherein the specific sub-steps of introducing multi-level sampling in step S5-2 are as follows:

step 1: collecting $N_c$ points on the rays by stratified sampling;

step 2: inputting the sampled points, and preliminarily evaluating the neural network at the sampled points by using the quadrature method;

step 3: generating the probability density function by normalization, and rewriting the integration formula in step S4-2 as:

$$\hat{C}_r(r) = \sum_{i=1}^{N} \omega_i c_i;$$

wherein
$\omega_i = T_i \cdot (1 - \exp(-\sigma_i \cdot \delta_i))$, $\omega_i$ is normalized $$\hat{\omega}_i = \frac{\omega_i}{\sum_{j=1}^{N_c} \omega_j}$$

to generate a piecewise constant probability density function;

step 4: collecting $N_f$ points along each ray based on the above probability density function; and step 5: evaluating the neural network more accurately by using the collected ($N_c + N_f$) points, so as to better render the ray colors.

9. A computer program product comprising a non-transitory computer readable medium having instructions recorded thereon, the instructions when executed by a computer implementing a method for constructing a three-dimensional data set of a pedestrian re-identification based on a neural radiation field, comprising the following steps:

S1: capturing images of pedestrians to be entered by a group of cameras at different viewing angles;

S2: generating a three-dimensional spatial position point set by sampling through camera rays in the scenario, and converting observation directions of the cameras corresponding to the three-dimensional spatial position point set into three-dimensional Cartesian unit vectors;

S3: inputting, into a multi-layer sensor, the three-dimensional spatial position point set and the observation directions converted into the three-dimensional Cartesian unit vectors, to output corresponding densities and colors;

S4: accumulating, by using a neural volume rendering method, ray colors passing through each pixel into the images captured in step S1, including the following sub-steps:

S4-1: defining cumulative transparency rates of the camera rays by continuous integration, and generating definitions of the ray colors accordingly;

S4-2: estimating the ray colors by using a quadrature method, dividing near boundaries to far boundaries of the rays into N uniformly spaced intervals, and selecting discrete points by using a stratified sampling method;

S5: introducing position encoding and multi-level sampling to improve the quality of the images generated by the accumulation of ray colors in step S4, specifically:

S5-1: introducing position encoding: encoding the spatial positions of the points, and converting the three-dimensional vectors input into a neural network into specified dimensions, to increase the accuracy of the generated images;

S5-2: introducing multi-level sampling: first collecting a group of points by stratified sampling, preliminarily evaluating the neural network, generating a probability density function based on the output of the preliminarily evaluated neural network, then collecting points along each ray based on the probability density function, and combining the points sampled twice to evaluate the neural network more accurately; and S6: labeling the generated images and storing the same in a data set.

* * * * *